US012696033B2

(12) United States Patent
Chiang et al.

(10) Patent No.: US 12,696,033 B2
(45) Date of Patent: Jul. 28, 2026

(54) DISPLAY APPARATUS AND SOUND RECEPTION CONTROL METHOD THEREOF

(71) Applicant: BENQ CORPORATION, Taipei City (TW)

(72) Inventors: Chin-Fu Chiang, New Taipei City (TW); Chih-Wen Li, Taoyuan City (TW)

(73) Assignee: BENQ CORPORATION, Taipei City (TW)

( * ) Notice: Subject to any disclaimer, the term of this patent is extended or adjusted under 35 U.S.C. 154(b) by 127 days.

(21) Appl. No.: 18/803,622

(22) Filed: Aug. 13, 2024

(65) Prior Publication Data

US 2025/0267401 A1 Aug. 21, 2025

(30) Foreign Application Priority Data

Feb. 16, 2024 (TW) ................................ 113105526

(51) Int. Cl.

*H04R 3/00* (2006.01)
*H04R 1/02* (2006.01)
*H04R 5/027* (2006.01)
*H04S 3/00* (2006.01)

(52) U.S. Cl.

CPC ............ *H04R 3/005* (2013.01); *H04R 1/028* (2013.01); *H04R 5/027* (2013.01); *H04S 3/008* (2013.01); *H04R 2499/15* (2013.01); *H04S 2400/01* (2013.01); *H04S 2400/15* (2013.01)

(58) Field of Classification Search

CPC ........ H04R 3/005; H04R 1/028; H04R 5/027; H04R 2499/15; H04S 3/008; H04S 2400/01; H04S 2400/15

USPC ................................ 381/1, 56, 58, 333, 388

See application file for complete search history.

(56) References Cited

U.S. PATENT DOCUMENTS

| | | | | |
|---|---|---|---|---|
| 5,870,485 | A * | 2/1999 | Lundgren | G06F 1/1605 381/361 |
| 10,038,957 | B2 * | 7/2018 | Laaksonen | H04R 5/02 |
| 11,766,209 | B2 * | 9/2023 | Sumi | A61B 5/4088 704/254 |
| 2001/0011993 | A1 * | 8/2001 | Saarinen | H04R 5/04 345/156 |
| 2005/0237699 | A1 | 10/2005 | Carroll | |

(Continued)

FOREIGN PATENT DOCUMENTS

| | | |
|---|---|---|
| CN | 107040843 | 8/2017 |

*Primary Examiner* — William A Jerez Lora
(74) *Attorney, Agent, or Firm* — Winston Hsu

(57) ABSTRACT

A display apparatus includes a first display device having two first sound reception units, a second display device having two second sound reception units, and a sound reception processor. The second display device is connected to a side of the first display device. The sound reception processor is coupled to the first sound reception units and the second sound reception units. The sound reception processor turns on at least one of the first sound reception units to receive sound in a first normal direction of the first display device for generating a first directional sound signal, turns on at least one of the second sound reception units to receive sound in a second normal direction of the second display device for generating a second directional sound signal, and generates a stereo signal according to the first directional sound signal and the second directional sound signal.

19 Claims, 3 Drawing Sheets

(56) References Cited

U.S. PATENT DOCUMENTS

| | | | | |
|---|---|---|---|---|
| 2015/0319530 | A1* | 11/2015 | Virolainen | G06T 7/248<br>381/303 |
| 2021/0124389 | A1* | 4/2021 | NakaMats | H04M 1/0214 |
| 2022/0206669 | A1* | 6/2022 | Kikukawa | G06F 1/1694 |

* cited by examiner

DISPLAY APPARATUS AND SOUND RECEPTION CONTROL METHOD THEREOF

BACKGROUND OF THE INVENTION

1. Field of the Invention

The present invention relates to a display apparatus and a sound reception control method thereof, and more specifically, to a display apparatus utilizing a sound reception processor to selectively turn on sound reception units on display devices connected to each other for generating a stereo signal and a sound reception control method thereof.

2. Description of the Prior Art

In general, when a display device incorporates sound reception units (e.g., microphones) for sound reception operations, no matter only one sound reception unit is placed on one side of the display device or two sound reception units are placed on both sides of the display device, the display device will only synthesize received sound signals into a sound signal with one single sound channel since a direction of sound reception is often at the same angle. However, the aforesaid sound signal with one single sound channel does not include sound channel information, such as time differences, sound pressure differences, or phase differences between sound channels. Therefore, when a speaker device of the display device plays the sound signal generated by the sound reception unit, the display device is unable to demonstrate the directionality of the sound signal to create a stereo effect.

Thus, even in the application situation where multiple display devices are arranged side by side to construct a widescreen display device, each display device still only processes sound signals received by its own sound reception units into a mono-channel sound signal. Therefore, the aforesaid multi-display assembly design also cannot provide a multi-channel stereo effect, thereby significantly affecting a user's audio-visual experience when watching multimedia content played on the assembled display devices.

SUMMARY OF THE INVENTION

The present invention provides a display apparatus including a first display device, a second display device, and a sound reception processor. The first display device has at least two first sound reception units. The second display device is connected to a side of the first display device and has at least two second sound reception units. The sound reception processor is electrically connected to the at least two first sound reception units and the at least two second sound reception units. The sound reception processor turns on at least one of the at least two first sound reception units to receive sound in a first normal direction of the first display device to generate a first directional sound signal, turns on at least one of the at least two second sound reception units to receive sound in a second normal direction of the second display device to generate a second directional sound signal, and generates a stereo signal according to the first directional sound signal and the second directional sound signal.

The present invention further provides a sound reception control method for a display apparatus. The display apparatus includes a first display device and a second display device. The first display device has at least two first sound reception units. The second display device is connected to a side of the first display device and has at least two second sound reception units. The sound reception control method includes a sound reception processor turning on at least one of the at least two first sound reception units to receive sound in a first normal direction of the first display device to generate a first directional sound signal, the sound reception processor turning on at least one of the at least two second sound reception units to receive sound in a second normal direction of the second display device to generate a second directional sound signal, and the sound reception processor generating a stereo signal according to the first directional sound signal and the second directional sound signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
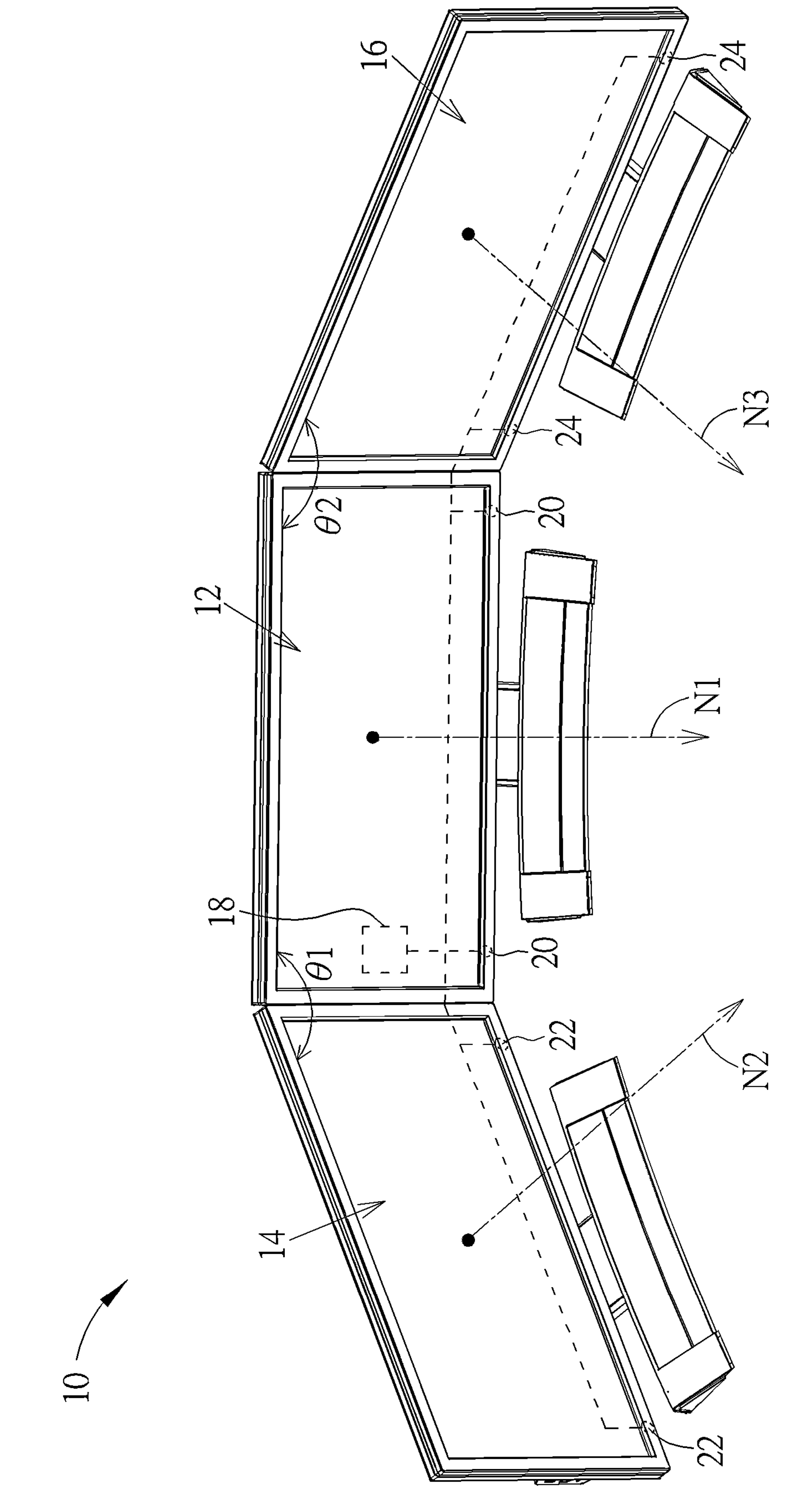
FIG. 1 is a diagram of a display apparatus according to an embodiment of the present invention.

The present invention will now be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to scale and the configuration of each component (e.g., structural designs of display devices and relative positional relationships among display devices, a sound reception processor and sound reception units) in the drawings is merely illustrative, not presenting an actual condition of the embodiments.

Please refer to FIG. 1, which is a diagram of a display apparatus 10 according to an embodiment of the present invention. For clearly showing the circuit layout configuration of a sound reception processor and sound reception units, a sound reception processor 18 and sound reception units on the display apparatus 10 are simply indicated with dashed lines. As shown in FIG. 1, the display apparatus 10 includes a first display device 12, a second display device 14, at least one third display device 16 (one shown in FIG. 1, but not limited thereto, meaning the connection number of display devices depends on the actual application needs of the display apparatus 10), and the sound reception processor 18, thereby constructing a wide-screen display device formed by three display devices side by side. The related description for the display connection design of the display apparatus 10 is commonly seen in the prior art and omitted herein.

The first display device 12 is provided with at least two first sound reception units 20. The second display device 14 is connected to one side of the first display device 12 and is provided with at least two second sound reception units 22. The third display device 16 is connected to another side of the first display device 12 and is provided with at least two third sound reception units 24. The first display device 12, the second display device 14, and the third display device 16 could be preferably LCD (Liquid Crystal Display) screens (e.g., TFT (Thin Film Transistor) screens, OLED (Organic Light Emitting Diode) screens, or micro LED (Light Emitting Diode) screens, but not limited thereto). Connection angles (e.g., connection angles θ1 and θ2 shown in FIG. 1) could be preferably less than 180 degrees to produce an audio-visual surround effect (but not limited thereto, meaning that the present invention could adopt a parallel side-by-side connection design in another embodiment). The first sound reception units 20, the second sound reception units 22, and the third sound reception units 24 could be preferably microphones, and there could be preferably two sound reception units arranged on left and right sides of each display device. However, the type and number/position of sound reception units used in the present invention could be not limited thereto, and it depends on the actual application needs of the display apparatus 10. The sound reception processor 18 is electrically connected to the first sound reception units 20, the second sound reception units 22, and the third sound reception units 24. The sound reception processor 18 could be any form of processing device, such as a central processing unit, a microprocessor, a logic processor, or a programmable chip, to perform subsequent multi-channel audio processing, and could be integrated with any audio-visual processing application software.

Via the aforesaid design, the sound reception processor 18 could turn on at least one of the first sound reception units 20 to receive sound in a first normal direction N1 of the first display device 12 to generate a first directional sound signal, turn on at least one of the second sound reception units 22 to receive sound in a second normal direction N2 of the second display device 14 to generate a second directional sound signal, and turn on at least one of the third sound reception units 24 to receive sound in a third normal direction N3 of the third display device 16 to generate a third directional sound signal. The sound reception processor 18 could then generate a stereo signal with multiple channels according to the first directional sound signal received by the first sound reception unit 20, the second directional sound signal received by the second sound reception unit 22, and the third directional sound signal received by the third sound reception unit 24, allowing the display apparatus 10 to provide a multi-channel stereo effect.

Figure 2:
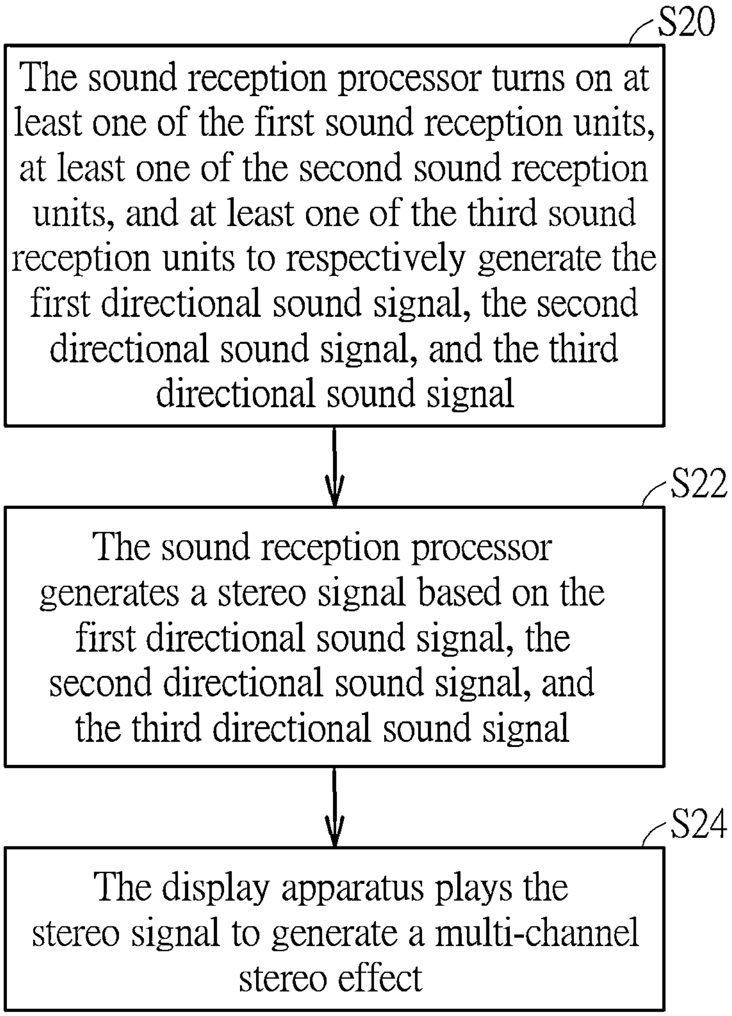
FIG. 2 is a flowchart of a sound reception control method according to an embodiment of the present invention.

More detailed description for the sound reception control method provided by the present invention is provided as follows. Please refer to FIG. 2, which is a flowchart of the sound reception control method according to an embodiment of the present invention. The sound reception control method executed by the display apparatus 10 includes the following steps.

Step S20: The sound reception processor 18 turns on at least one of the first sound reception units 20, at least one of the second sound reception units 22, and at least one of the third sound reception units 24 to respectively generate a first directional sound signal, a second directional sound signal, and a third directional sound signal.

Step S22: The sound reception processor 18 generates a stereo signal based on the first directional sound signal, the second directional sound signal, and the third directional sound signal.

Step S24: The display apparatus 10 plays the stereo signal to generate a multi-channel stereo effect.

The detailed description for the above steps is provided as follows. First, in Step S20, to achieve a better stereo effect, the sound reception processor 18 could selectively turn on the first sound reception unit 20 of the first display device 12 that is relatively close to the second display device 14 (i.e., the first sound reception unit 20 on a left side of the first display device 12, but not limited thereto, meaning that the sound reception processor 18 could turn on the first sound reception unit 20 on a right side of the first display device 12 that is relatively close to the third display device 16) to receive sound in a first normal direction N1, thereby generating the first directional sound signal corresponding to a front sound channel of the display apparatus 10. At the same time, the sound reception processor 18 could also turn on the second sound reception unit 22 of the second display device 14 that is relatively far from the first display device 12 (i.e., the second sound reception unit 22 on a leftmost side of the second display device 14) to receive sound in a second normal direction N2, thereby generating the second directional sound signal with a relatively large phase difference/sound pressure difference and corresponding to a left sound channel of the display apparatus 10. Similarly, the sound reception processor 18 could also turn on the third sound reception unit 24 of the third display device 16 that is relatively far from the first display device 12 (i.e., the third sound reception unit 24 on a rightmost side of the third display device 16) to receive sound in a third normal direction N3, thereby generating the third directional sound signal with a relatively large phase difference/sound pressure difference and corresponding to a right sound channel of the display apparatus 10.

Next, in Step S22, the sound reception processor 18 could receive the first directional sound signal (herein regarded as a front sound channel signal), the second directional sound signal (herein regarded as a left sound channel signal), and the third directional sound signal (herein regarded as a right sound channel signal), so as to generate the stereo signal with three sound channels. As described in Step S24, the stereo signal could be transmitted to the display apparatus 10 for playback (e.g., played through built-in or external speaker devices of the display apparatus 10), thereby providing a three-channel stereo effect when a user operates the display apparatus 10 to play multimedia content.

Thus, via the aforesaid sound reception control method of selectively turning on at least one sound reception unit on each display device, the display apparatus provided by the present invention can obtain directional sound signals with relatively large phase differences/sound pressure differences and synthesize these directional sound signals into a corresponding multi-channel stereo signal, so as to effectively solve the prior art problem that each display device only processes sound signals received by its own sound reception units into a mono-channel sound signal and cannot provide a multi-channel stereo effect. Thus, the present invention can greatly enhance the user's audio-visual experience when watching multimedia content played on spliced display devices.

It should be mentioned that the present invention could also adopt a sound reception control method that simultaneously turns on multiple second sound reception units on the second display device 14 and multiple third sound reception units on the third display device 16. For example, as shown in FIG. 1, since the second sound reception units 22 on the left and right sides of the second display device 14 could respectively receive directional sound signals with different phase differences, and the third sound reception units 24 on the left and right sides of the third display device

16 could also respectively receive directional sound signals with different phase differences, the sound reception processor 18 could simultaneously turn on the second sound reception units 22 on the left and right sides of the second display device 14 to generate the second directional sound signal, which includes a first side sound channel signal and a second side sound channel signal with different phase differences/sound pressure differences. At the same time, the sound reception processor 18 could also simultaneously turn on the third sound reception units 24 on the left and right sides of the third display device 16 to generate the third directional sound signal, which includes a third side sound channel signal and a fourth side sound channel signal with different phase differences/sound pressure differences.

Next, the sound reception processor 18 could receive the aforesaid first directional sound signal (herein regarded as a front sound channel signal), the first side sound channel signal (herein regarded as a left front sound channel signal), the second side sound channel signal (herein regarded as a left sound channel signal), the third side sound channel signal (herein regarded as a right front sound channel signal), and the fourth side sound channel signal (herein regarded as a right sound channel signal), and synthesize these sound signals into the stereo signal with five sound channels, which is transmitted to the display apparatus 10 for playback (e.g., played through built-in or external speaker devices of the display apparatus 10), thereby providing a corresponding five-channel stereo effect when the user operates the display apparatus 10 to play multimedia content. Thus, the present invention can greatly enhance the user's audio-visual experience when watching multimedia content played on spliced display devices.

In practical applications, the present invention could also adopt a sound reception control method that simultaneously turns on multiple sound reception units on the display device to integrate a single-channel sound signal. For example, the sound reception processor 18 could simultaneously turn on the two first sound reception units 20 on the first display device 12 to receive sound in the first normal direction N1, thereby integrating sound signals from the left and right sides of the first display device 12 to generate the first directional sound signal with one single sound channel and corresponding to a front of the display apparatus 10. At the same time, the sound reception processor 18 could simultaneously turn on the two second sound reception units 22 on the second display device 14 to receive sound in the second normal direction N2, thereby integrating sound signals from the left and right sides of the second display device 14 to generate the second directional sound signal with one single sound channel and corresponding to a left side of the display apparatus 10. Similarly, the sound reception processor 18 could simultaneously turn on the two third sound reception units 24 on the third display device 16 to receive sound in the third normal direction N3, thereby integrating sound signals from the left and right sides of the third display device 16 to generate the third directional sound signal with one single sound channel and corresponding to a right side of the display apparatus 10. Next, the sound reception processor 18 could receive the first directional sound signal corresponding to the front sound channel, the second directional sound signal corresponding to the left sound channel, and the third directional sound signal corresponding to the right sound channel, and synthesize these sound signals into the stereo signal with three sound channels, which is transmitted to the display apparatus 10 for playback, thereby providing a corresponding three-channel stereo effect when the user operates the display apparatus 10 to play multimedia content.

In addition to the embodiment that can provide the stereo effect with three or more sound channels, the present invention could also adopt a sound reception control method that turns off the first sound reception units 20 of the first display device 12 to provide a two-channel stereo effect. For example, the sound reception processor 18 could turn off both first sound reception units 20 on the first display device 12, and turn on the second sound reception unit 22 on the second display device 14 that is relatively far from the first display device 12 (i.e., the second sound reception unit 22 on the leftmost side of the second display device 14), so that the second sound reception unit 22 could receive sound in the second normal direction N2, thereby generating the second directional sound signal with a relatively large phase difference/sound pressure difference and corresponding to the left sound channel of the display apparatus 10. Similarly, the sound reception processor 18 could turn on the third sound reception unit 24 on the third display device 16 that is relatively far from the first display device 12 (i.e., the third sound reception unit 24 on the rightmost side of the third display device 16), so that the third sound reception unit 24 could receive sound in the third normal direction N3, thereby generating the third directional sound signal with a relatively large phase difference/sound pressure difference and corresponding to the right sound channel of the display apparatus 10. Next, the sound reception processor 18 could receive the second directional sound signal and the third directional sound signal, which respectively correspond to the left sound channel and the right sound channel, and synthesize these directional sound signals into a corresponding two-channel stereo signal, which is transmitted to the display apparatus 10 for playback, thereby providing a corresponding two-channel stereo effect when the user operates the display apparatus 10 to play multimedia content.

Figure 3:
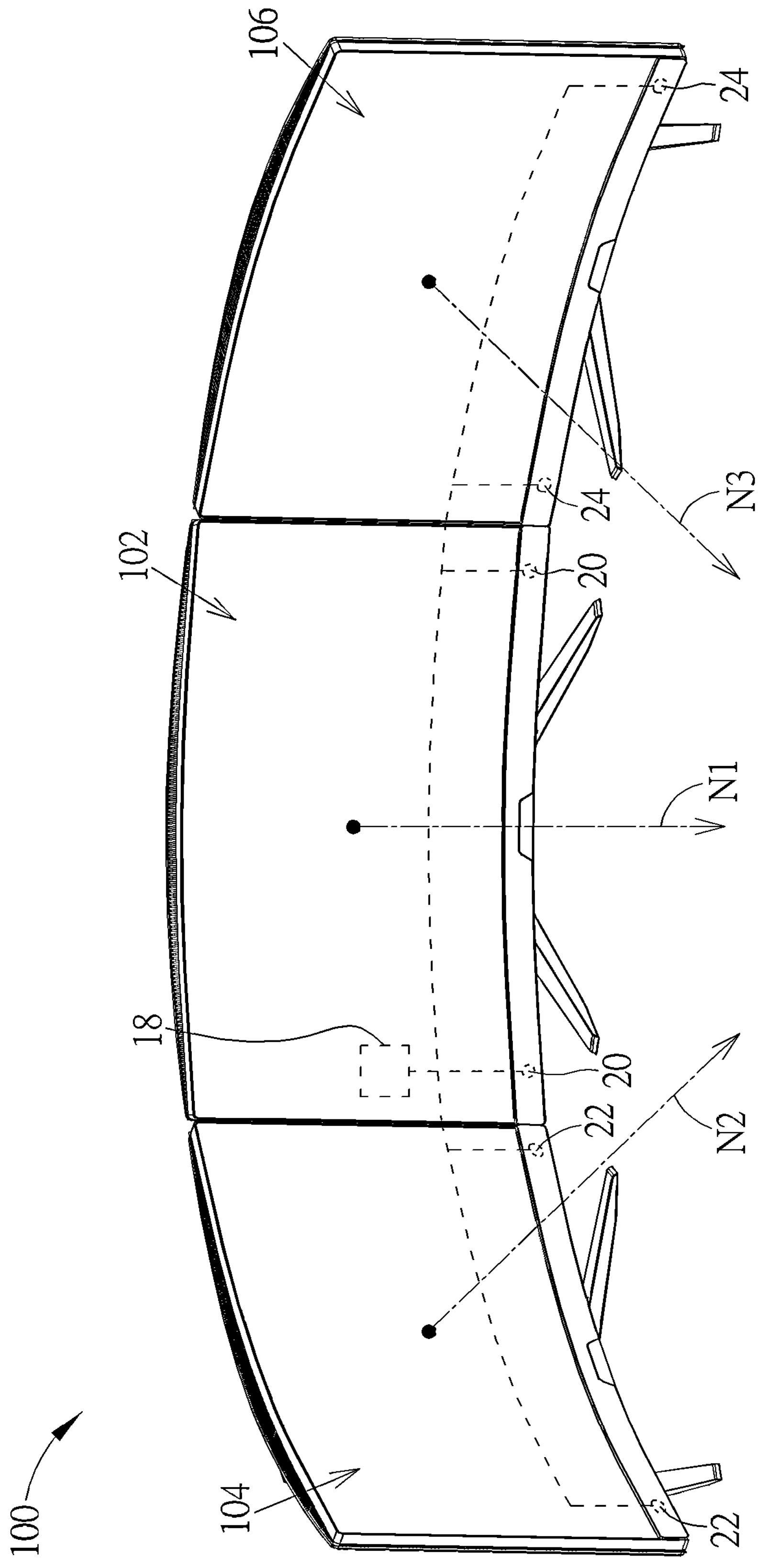
FIG. 3 is a diagram of a display apparatus according to another embodiment of the present invention.

Furthermore, the present invention could also adopt a curved screen connection design. For example, please refer to FIG. 3, which is a diagram of a display apparatus 100 according to another embodiment of the present invention. Components both mentioned in this embodiment and the aforesaid embodiments represent components with the same or similar structures and functions, and the related description is omitted herein. As shown in FIG. 3, the display apparatus 100 includes a first display device 102, a second display device 104, at least one third display device 106 (one shown in FIG. 3, but not limited thereto, meaning that the connection number of screens depends on the actual application needs of the display apparatus 100), and the sound reception processor 18, thereby constructing a wide curved screen display device formed by three display devices side by side. Additionally, the related description for the screen connection design of the display apparatus 100 is commonly seen in the prior art and omitted herein.

The first display device 102 is provided with at least two first sound reception units 20. The second display device 104 is connected to one side of the first display device 102 and is provided with at least two second sound reception units 22. The third display device 106 is connected to another side of the first display device 102 and is provided with at least two third sound reception units 24. The first display device 102, the second display device 104, and the third display device 106 could be preferably curved LCD screens (e.g., curved TFT screens, curved OLED screens, or curved micro LED screens, but not limited thereto). Via the aforesaid curved screen connection design, the present invention can utilize curvatures of the first display device 102, the second display device 104, and the third display device 106 to expand the overall screen surround range of the display apparatus 100 (for example, the display apparatus 100 could be expanded to have a screen surround range of −90 degrees to 90 degrees relative to the first display device 102, but not limited thereto), thereby further enhancing the audio-visual surround effect of the display apparatus 100. As for other related description for this embodiment (e.g., the sound reception control method of the display apparatus 100), it could be reasoned by analogy according to the aforesaid embodiments and omitted herein.

To be noted, the present invention could also adopt a dual screen connection configuration to simplify the screen connection design of the display apparatus. In brief, the display apparatus could include only the first display device 12, the second display device 14, and the sound reception processor 18 to construct a wide-screen display device formed by two display devices side by side. Via the aforesaid design, the sound reception processor 18 could turn on at least one of the first sound reception units 20 (e.g., the first sound reception unit 20 of the first display device 12 that is relatively far from the second display device 14, but not limited thereto), to receive sound in the first normal direction N1 and generate the first directional sound signal. At the same time, the sound reception processor 18 could turn on at least one of the second sound reception units 22 (e.g., the second sound reception unit 22 of the second display device 14 that is relatively far from the first display device 12, but not limited thereto), to receive sound in the second normal direction N2 and generate the second directional sound signal. In such a manner, the sound reception processor 18 could receive the first directional sound signal (herein regarded as a right sound channel signal) and the second directional sound signal (herein regarded as a left sound channel signal) to generate a corresponding two-channel stereo signal, allowing the display apparatus to provide a two-channel stereo effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display apparatus comprising:

a first display device having at least two first sound reception units;

a second display device connected to a side of the first display device and having at least two second sound reception units;

at least one third display device connected to another side of the first display device and having at least two third sound reception units; and a sound reception processor electrically connected to the at least two first sound reception units, the at least two second sound reception units and the at least two third sound reception units, the sound reception processor turning on at least one of the at least two first sound reception units to receive sound in a first normal direction of the first display device to generate a first directional sound signal, turning on at least one of the at least two second sound reception units to receive sound in a second normal direction of the second display device to generate a second directional sound signal, turning on at least one of the at least two third sound reception units to receive sound in a third normal direction of the third display device to generate a third directional sound signal, and generating a stereo signal according to the first directional sound signal, the second directional sound signal and the third directional sound signal.

2. The display apparatus of claim 1, wherein the sound reception processor turns on the first sound reception unit of the first display device that is far from the second display device and turns on the second sound reception unit of the second display device that is far from the first display device for respectively generating the first directional sound signal and the second directional sound signal.

3. The display apparatus of claim 1, wherein the sound reception processor is further used to turn off the two first sound reception units, turn on the second sound reception unit of the second display device that is far from the first display device, and turn on the third sound reception unit of the third display device that is far from the first display device for respectively generating the second directional sound signal and the third directional sound signal; the sound reception processor generates the stereo signal with two sound channels according to the second directional sound signal and the third directional sound signal.

4. The display apparatus of claim 1, wherein the sound reception processor turns on the second sound reception unit of the second display device that is far from the first display device and turns on the third sound reception unit of the third display device that is far from the first display device for respectively generating the second directional sound signal and the third directional sound signal; the sound reception processor generates the stereo signal with three sound channels according to the first directional sound signal, the second directional sound signal, and the third directional sound signal.

5. The display apparatus of claim 1, wherein the sound reception processor simultaneously turns on the at least two second sound reception units to generate the second directional sound signal, the second directional sound signal comprises a first side channel signal and a second side channel signal with different phase differences; the sound reception processor simultaneously turns on the at least two third sound reception units to generate the third directional sound signal, the third directional sound signal comprises a third side channel signal and a fourth side channel signal with different phase differences; the sound reception processor generates the stereo signal with five sound channels according to the first directional sound signal, the first side channel signal, the second side channel signal, the third side channel signal, and the fourth side channel signal.

6. The display apparatus of claim 1, wherein the sound reception processor simultaneously turns on the at least two first sound reception units to cooperatively generate the first directional sound signal with one single sound channel, simultaneously turns on the at least two second sound reception units to cooperatively form the second directional sound signal with one single sound channel, and simultaneously turns on the at least two third sound reception units to cooperatively form the third directional sound signal with one single sound channel; the sound reception processor generates the stereo signal with three sound channels according to the first directional sound signal, the second directional sound signal, and the third directional sound signal.

7. The display apparatus of claim 1, wherein an angle of connection between the first display device and the second display device and an angle of connection between the first display device and the third display device are less than 180 degrees.

8. The display apparatus of claim 1, wherein at least one of the first display device, the second display device, and the third display device is a curved display screen.

9. The display apparatus of claim 1, wherein the first display device, the second display device, and the third display device are LCD (Liquid Crystal Display) screens, and the at least two first sound reception units, the at least two second sound reception units, and the at least two third sound reception units are microphones; the sound reception processor turns on the first sound reception unit of the first display device that is close to the second display device or the third display device, and turns on the second sound reception unit of the second display device that is far from the first display device and the third sound reception unit of the third display device that is far from the first display device; the sound reception processor generates the stereo signal with three sound channels according to the first directional sound signal, the second directional sound signal, and the third directional sound signal.

10. A sound reception control method for a display apparatus, the display apparatus comprising a first display device, a second display device and at least one third display device, the first display device having at least two first sound reception units, the second display device being connected to a side of the first display device and having at least two second sound reception units, the at least one third display device being connected to another side of the first display device and having at least two third sound reception units, the sound reception control method comprising:

- a sound reception processor turning on at least one of the at least two first sound reception units to receive sound in a first normal direction of the first display device to generate a first directional sound signal;
- the sound reception processor turning on at least one of the at least two second sound reception units to receive sound in a second normal direction of the second display device to generate a second directional sound signal;
- the sound reception processor turning on at least one of the at least two third sound reception units to receive sound in a third normal direction of the third display device to generate a third directional sound signal; and
- the sound reception processor generating a stereo signal according to the first directional sound signal, the second directional sound signal and the third directional sound signal.

11. The sound reception control method of claim 10, wherein the sound reception processor turns on the first sound reception unit of the first display device that is far from the second display device and turns on the second sound reception unit of the second display device that is far from the first display device for respectively generating the first directional sound signal and the second directional sound signal.

12. The sound reception control method of claim 10, wherein the sound reception processor is further used to turn off the two first sound reception units, turn on the second sound reception unit of the second display device that is far from the first display device, and turn on the third sound reception unit of the third display device that is far from the first display device for respectively generating the second directional sound signal and the third directional sound signal; the sound reception processor generates the stereo signal with two sound channels according to the second directional sound signal and the third directional sound signal.

13. The sound reception control method of claim 10, wherein the sound reception processor turns on the second sound reception unit of the second display device that is far from the first display device and turns on the third sound reception unit of the third display device that is far from the first display device for respectively generating the second directional sound signal and the third directional sound signal; the sound reception processor generates the stereo signal with three sound channels according to the first directional sound signal, the second directional sound signal, and the third directional sound signal.

14. The sound reception control method of claim 10, wherein the sound reception processor simultaneously turns on the at least two second sound reception units to generate the second directional sound signal, the second directional sound signal comprises a first side channel signal and a second side channel signal with different phase differences; the sound reception processor simultaneously turns on the at least two third sound reception units to generate the third directional sound signal, the third directional sound signal comprises a third side channel signal and a fourth side channel signal with different phase differences; the sound reception processor generates the stereo signal with five sound channels according to the first directional sound signal, the first side channel signal, the second side channel signal, the third side channel signal, and the fourth side channel signal.

15. The sound reception control method of claim 10, wherein the sound reception processor simultaneously turns on the at least two first sound reception units to cooperatively generate the first directional sound signal with one single sound channel, simultaneously turns on the at least two second sound reception units to cooperatively form the second directional sound signal with one single sound channel, and simultaneously turns on the at least two third sound reception units to cooperatively form the third directional sound signal with one single sound channel; the sound reception processor generates the stereo signal with three sound channels according to the first directional sound signal, the second directional sound signal, and the third directional sound signal.

16. The sound reception control method of claim 10, wherein an angle of connection between the first display device and the second display device and an angle of connection between the first display device and the third display device are less than 180 degrees.

17. The sound reception control method of claim 10, wherein at least one of the first display device, the second display device, and the third display device is a curved display screen.

18. The sound reception control method of claim 10, wherein the first display device, the second display device, and the third display device are LCD screens, and the at least two first sound reception units, the at least two second sound reception units, and the at least two third sound reception units are microphones; the sound reception processor turns on the first sound reception unit of the first display device that is close to the second display device or the third display device, and turns on the second sound reception unit of the second display device that is far from the first display device and the third sound reception unit of the third display device that is far from the first display device; the sound reception processor generates the stereo signal with three sound channels according to the first directional sound signal, the second directional sound signal, and the third directional sound signal.

19. A display apparatus comprising:

a first display device having at least two first sound reception units;

a second display device connected to a side of the first display device and having at least two second sound reception units; and a sound reception processor electrically connected to the at least two first sound reception units and the at least two second sound reception units, the sound reception processor turning on the first sound reception unit that is far from the second display device to receive sound in a first normal direction of the first display device to generate a first directional sound signal, turning on the second sound reception unit that is far from the first display device to receive sound in a second normal direction of the second display device to generate a second directional sound signal, and generating a stereo signal according to the first directional sound signal and the second directional sound signal.

* * * * *